US011501282B2

(12) United States Patent
Zhang et al.

(10) Patent No.: US 11,501,282 B2
(45) Date of Patent: *Nov. 15, 2022

(54) METHOD AND APPARATUS FOR PAYING FARE (71) Applicant: ADVANCED NEW TECHNOLOGIES CO., LTD., Grand Cayman (KY)

(72) Inventors: Hong Zhang, Hangzhou (CN); Jun Wu, Hangzhou (CN); Jiankang Sun, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,685

(22) Filed: Jun. 28, 2021

(65) Prior Publication Data

US 2021/0342814 A1 Nov. 4, 2021

Related U.S. Application Data (63) Continuation of application No. 16/743,120, filed on Jan. 15, 2020, now Pat. No. 11,074,575, which is a
(Continued)

(30) Foreign Application Priority Data

Oct. 31, 2017 (CN) .......................... 201711054359.7

(51) Int. Cl.
*G06Q 20/32* (2012.01)
*G06Q 20/14* (2012.01)
(Continued)

(52) U.S. Cl.
CPC ....... *G06Q 20/3278* (2013.01); *G06Q 20/145* (2013.01); *G06Q 20/28* (2013.01);
(Continued)

(58) Field of Classification Search
None
See application file for complete search history.

(56) References Cited

U.S. PATENT DOCUMENTS 8,523,061 B2   9/2013 Roux
8,606,710 B2  12/2013 Park
(Continued)

FOREIGN PATENT DOCUMENTS

CN   1797476 A    7/2006
CN  103533178 A   1/2014
(Continued)

OTHER PUBLICATIONS

Written Opinion of the International Searching Authority and International Search Report for PCT Application No. PCT/CN2018/105951 dated Nov. 22, 2018 with partial English translation (9 pages).

(Continued)

*Primary Examiner* — Jessica Lemieux (57) ABSTRACT

Some embodiments of the application disclose a method and apparatus for paying a fare. When a user takes a public transit means, the user terminal establishes an NFC connection with the fare-collecting device of the public transit means, the user terminal transmits the encrypted account ID of the user to the fare-collecting device, and the fare-collecting device may request a server to deduct the fare from the account of the user.

17 Claims, 4 Drawing Sheets

Related U.S. Application Data continuation of application No. PCT/CN2018/105951, filed on Sep. 17, 2018.

(51) Int. Cl.
- *G06Q 20/28* (2012.01)
- *G06Q 20/38* (2012.01)
- *G06Q 20/40* (2012.01)
- *H04L 9/32* (2006.01)

(52) U.S. Cl.
CPC ....... *G06Q 20/3821* (2013.01); *G06Q 20/407* (2013.01); *G06Q 2220/10* (2013.01); *H04L 9/3226* (2013.01); *H04L 9/3297* (2013.01)

(56) References Cited

U.S. PATENT DOCUMENTS

| | | | |
|---|---|---|---|
| 9,098,843 | B2 | 8/2015 | Fuerstenberg et al. |
| 9,501,768 | B2 | 11/2016 | Ho et al. |
| 10,249,013 | B2 | 4/2019 | Yang |
| 10,282,919 | B2 | 5/2019 | Joo et al. |
| 2008/0128513 | A1* | 6/2008 | Hammad ........... G06Q 20/3576 235/492 |
| 2008/0201212 | A1 | 8/2008 | Hammad et al. |
| 2009/0187492 | A1 | 7/2009 | Hammad et al. |
| 2010/0043061 | A1 | 2/2010 | Martin et al. |
| 2011/0016054 | A1 | 1/2011 | Dixon et al. |
| 2014/0201066 | A1 | 7/2014 | Roux et al. |
| 2014/0219453 | A1* | 8/2014 | Neafsey ................ H04W 12/04 380/270 |
| 2015/0066604 | A1 | 3/2015 | Jeong et al. |
| 2016/0019726 | A1 | 1/2016 | Joy et al. |
| 2016/0019727 | A1 | 1/2016 | Norton et al. |
| 2016/0021067 | A1* | 1/2016 | Liu .................... H04L 63/0428 713/168 |
| 2016/0055693 | A1* | 2/2016 | Somani ................. G07B 15/02 340/5.61 |
| 2016/0117867 | A1 | 4/2016 | Yuan |
| 2016/0379141 | A1 | 12/2016 | Judge et al. |
| 2017/0083904 | A1 | 3/2017 | Vadera |
| 2017/0109740 | A1 | 4/2017 | Besch et al. |
| 2017/0161861 | A1 | 6/2017 | Hong et al. |
| 2017/0195322 | A1 | 7/2017 | Cho et al. |
| 2017/0236113 | A1* | 8/2017 | Chitalia ............. G06Q 20/3276 705/44 |
| 2017/0278103 | A1 | 9/2017 | Cheon et al. |
| 2018/0211188 | A1 | 7/2018 | Bergdale et al. |
| 2019/0014527 | A1 | 1/2019 | Todasco et al. |
| 2019/0279326 | A1 | 9/2019 | Chen et al. |
| 2019/0306716 | A1 | 10/2019 | Bergdale et al. |
| 2019/0333063 | A1 | 10/2019 | Lim |

FOREIGN PATENT DOCUMENTS

| | | |
|---|---|---|
| CN | 104363199 A | 2/2015 |
| CN | 105096109 A | 11/2015 |
| CN | 105512886 A | 4/2016 |
| CN | 106251143 A | 12/2016 |
| CN | 106846506 A | 6/2017 |
| CN | 107944857 A | 4/2018 |
| EP | 2950229 A1 | 12/2015 |
| WO | 2016/207715 A1 | 12/2016 |

OTHER PUBLICATIONS

First Search Report for Chinese Application No. 201711054359.7 dated Jan. 3, 2020.
Search Report for European Application No. 18874460.1 dated Jun. 30, 2020.
Jsan-Erik Ekberg et al., "Mass Transit Ticketing with NFC Mobile Phones", Nov. 27, 2011.
International Preliminary Report on Patentability Chapter I for PCT Application No. PCT/CN2018/105951 dated May 14, 2020.
F. Dang et al., "Large-scale invisible attack on AFC systems with NFC-equipped smartphones," IEEE INFOCOM 2017—IEEE Conference on Computer Communications, Atlanta, GA, 2017, pp. 1-9, doi:10.1109/INFOCOM.2017.8057219. (Year: 2017).
Examination Report for European Application No. 18 874 460.1 dated Mar. 9, 2021.
Written Opinion for Singaporean Application No. 11202001581V dated May 19, 2021.
Brief Communication for European Application No. 18 874 460.1 dated Jan. 17, 2022.
Hallam-Baker et al., "Session Identification URI <draft-hallam-http-session-id-00.txt>", Feb. 21, 1996.

\* cited by examiner

METHOD AND APPARATUS FOR PAYING FARE

CROSS REFERENCE TO RELATED APPLICATION

The present application is a continuation application of U.S. patent application Ser. No. 16/743,120 filed on Jan. 15, 2020, entitled "Method and Apparatus for Paying Fare," which is a continuation application of International Patent Application No. PCT/CN2018/105951, filed on Sep. 17, 2018, which claims priority to Chinese Patent Application No. 201711054359.7, filed on Oct. 31, 2017. The entire content of all of the above referenced applications is incorporated herein by reference.

TECHNICAL FIELD

The application relates to the field of information technology, and in particular relates to a method and apparatus for paying a fare.

BACKGROUND

Figure 1:
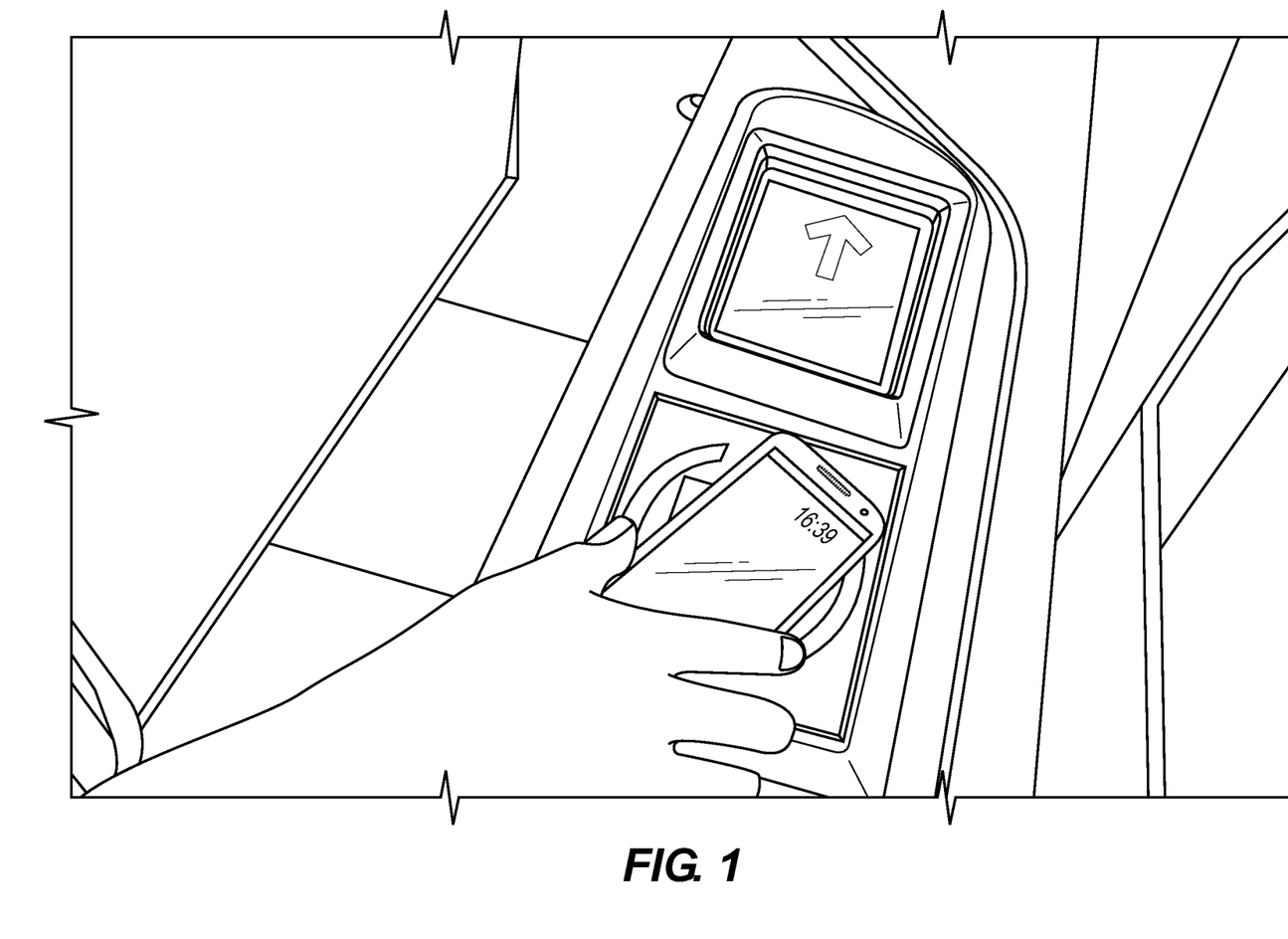
FIG. 1 shows a method of paying a fare by simulating a mobile phone into a public transit card.

Currently, the method of using the near field communication (NFC) function of a user terminal (for example, a mobile phone) to simulate the user terminal has come into use (e.g., as shown in FIG. 1, a mobile phone may be simulated into a public transit card so that the user can take a public transit means by "swiping the mobile phone.").

Generally, the user terminal which simulates a public transit card must have at least the following three hardware units: NFC front-end chip, NFC antenna and security chip. Among them, the NFC front-end chip and the NFC antenna are used to realize NFC communication, and the account ID and account balance of the public transit card are stored in the security chip in the form of hardware encryption, that is, the function of the security chip is to prevent the account balance from being maliciously tampered.

When using a user terminal to takes a public transit means, a user moves the user terminal close to a fare-collecting device of the public transit means, the fare-collecting device establishes an NFC connection with the user terminal, and the fare-collecting device has the permission to update the account balance stored in the security chip in the user terminal (for example, rewrite RMB100 into RMB98) over the NFC connection to collect the fare.

Based on the prior art, a low-cost method for paying a fare is desired.

SUMMARY

Some embodiments of the application provide a method and apparatus for paying a fare to solve the problem with the prior high-cost method for paying a fare.

To solve the above-mentioned technical problem, some embodiments of the application are realized in such a way:

The method for paying a fare in some embodiments of the application comprises: establishing, by a fare-collecting device of a public transit means, a near field communication (NFC) connection with a user terminal; receiving over the NFC connection encrypted data transmitted from the user terminal; decrypting the encrypted data to obtain an account ID of a user associated with the user terminal; and determining whether to send the account ID to a server for the server to deduct a fare from an account corresponding to the account ID.

In some embodiments, decrypting the encrypted data to obtain the account ID comprises: decrypting the encrypted data to obtain the account ID and a timestamp, and determining whether to send the account ID to the server comprises: determining whether a time interval between a time corresponding to the timestamp to a current time satisfies a condition; if yes, determining to send the account ID to the server; and if no, determining not to send the account ID to the server.

In some embodiments, decrypting the encrypted data to obtain the account ID further comprises: decrypting the encrypted data to obtain the account ID and a device ID, and determining whether to send the account ID to the server further comprises: determining whether the device ID is consistent with a device ID of the fare-collecting device; if yes, determining to send the account ID to the server; and if no, determining not to send the account ID to the server.

In some embodiments, in response to determining not to send the account ID to the server, the method further comprises at least one of the following: reporting an error; and closing an entrance.

In some embodiments, in response to determining to send the account ID to the server, the method further comprises opening the entrance.

In some embodiments, the encrypted data comprises: the account ID of the user associated with the user terminal and a timestamp corresponding to a time when the encrypted data is encrypted.

In some embodiments, the encrypted data comprises: the account ID of the user associated with the user terminal and a device ID of the fare-collecting device.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include establishing, by a fare-collecting device of a public transit means, a near field communication (NFC) connection with a user terminal; receiving over the NFC connection encrypted data transmitted from the user terminal; decrypting the encrypted data to obtain an account ID of a user associated with the user terminal; and determining whether to send the account ID to a server for the server to deduct a fare from an account corresponding to the account ID.

Yet another aspect of the present disclosure is directed to a non-transitory computer-readable storage medium configured with instructions executable by one or more processors to cause the one or more processors to perform operations. The operations may include establishing, by a fare-collecting device of a public transit means, a near field communication (NFC) connection with a user terminal; receiving over the NFC connection encrypted data transmitted from the user terminal; decrypting the encrypted data to obtain an account ID of a user associated with the user terminal; and determining whether to send the account ID to a server for the server to deduct a fare from an account corresponding to the account ID.

BRIEF DESCRIPTION OF THE DRAWINGS

To describe some embodiments of the application more clearly, the following briefly describes the drawings in the description of some embodiments. The drawings in the following description are used for illustration purpose.

DETAILED DESCRIPTION

Currently, a user terminal must have hardware units such as NFC front-end chip, NFC antenna and security chip so that the user can take a public transit means such as bus or subway by "swiping a mobile phone."

However, requiring a user terminal, for example, a mobile phone to have a security chip will lead to high hardware cost of the mobile phone, and furthermore, a large number of mobile phones available on the market have no security chip, and the users of these mobile phones may not be able to enjoy the convenience of taking a public transit means by "swiping a mobile phone."

In some embodiments of the application, a user's account balance may not be stored in a user terminal. The account of the user may be maintained by a server. The NFC front-end chip and NFC antenna of the user terminal may be utilized so that the user terminal may establish an NFC connection with the fare-collecting device of a public transit means, where the user terminal transmits the account ID of the user to the fare-collecting device, and then the fare-collecting device requests the server to deduct a fare from the account corresponding to the account ID.

For the convenience of description, the public transit means in the following description is a subway.

The technical solutions in some embodiments of the application are described in detail below in combination with the drawings.

Figure 2:
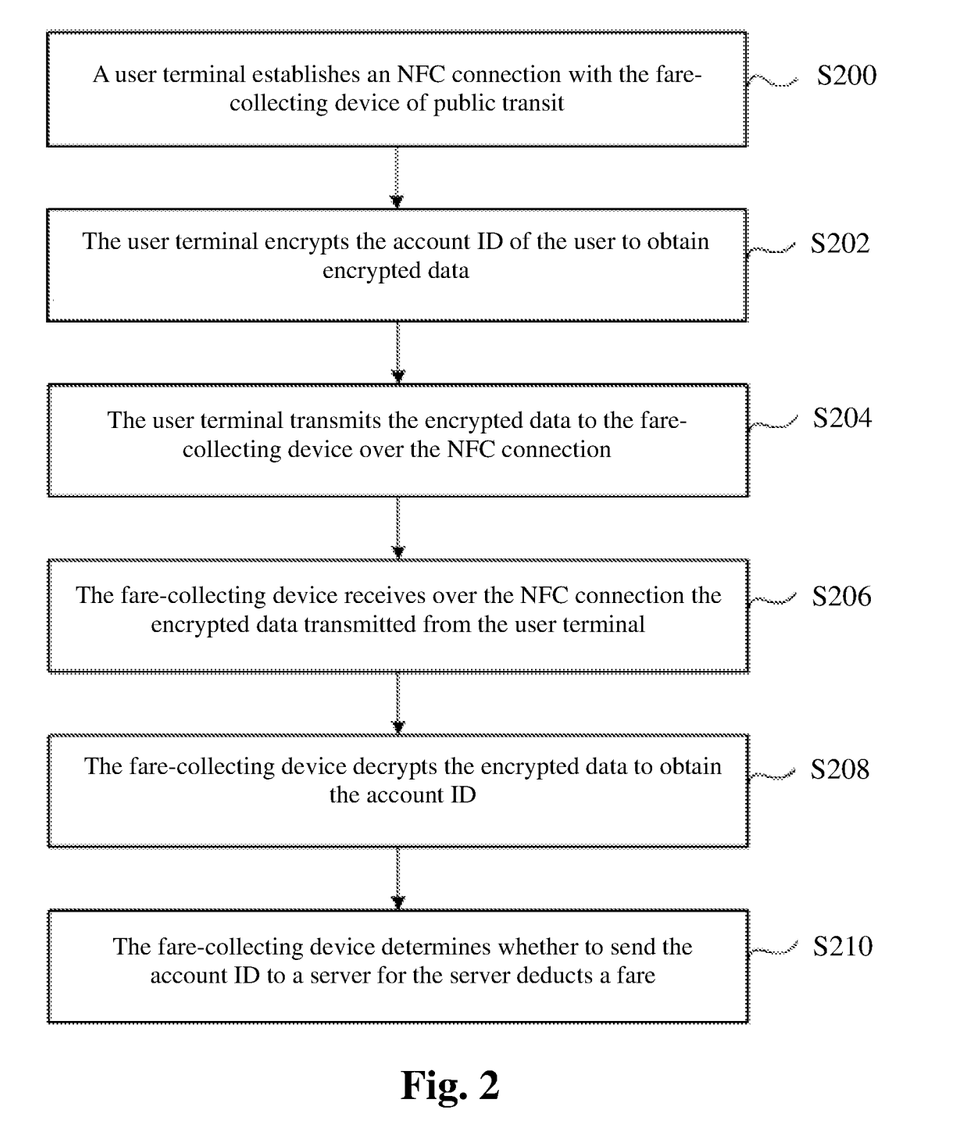
FIG. 2 is a flowchart of a method for paying a fare in some embodiments of the application.

FIG. 2 is a flowchart of a method for paying a fare in some embodiments of the application and the method comprises the following steps.

S200: A user terminal establishes an NFC connection with the fare-collecting device of a public transit means.

In some embodiments of the application, the user terminal may be a mobile phone, a tablet PC, a notebook PC or a smart device which may be applied in a mobile payment scenario. The fare-collecting device of the public transit means may be a subway gate or a card reader on a bus, and the fare-collecting device is a subway gate in the following description.

In this step, the user may move the user terminal close to the fare-collecting device, and when the distance between the user terminal and the fare-collecting device is not greater than the NFC induction distance, the user terminal may establish an NFC connection with the fare-collecting device.

The establishment of an NFC connection may be independent of the Internet or LAN, and therefore, when both the user terminal and the fare-collecting device are offline, an NFC connection may still be established between them.

S202: The user terminal encrypts the account ID of the user according to an encryption algorithm of the public transit system to obtain encrypted data.

S204: The user terminal transmits the encrypted data to the fare-collecting device over the NFC connection.

In some embodiments of the application, in order to prevent the account ID of the user from being maliciously intercepted during the transmission, the user terminal may encrypt the account ID of the user and transmit the encrypted data to the fare-collecting device over the NFC connection. In this way, even if the encrypted data is intercepted by a malicious user during the transmission, the lawbreaker cannot decrypt the encrypted data to obtain the account ID of the user.

The encryption algorithm the user terminal uses to encrypt the account ID in step S202 may be an encryption algorithm applicable to data transmission between the user terminal and the public transit means. The encryption algorithm may be executed by a payment application installed on the user terminal. The encryption algorithm may be agreed on in advance between the payment application and the public transit system (for example, a server of a subway corporation).

S206: The fare-collecting device receives over the NFC connection the encrypted data transmitted from the user terminal.

S208: The fare-collecting device decrypts the encrypted data to obtain the account ID.

S210: The fare-collecting device determines whether to send the account ID to a server for the server to deduct a fare from an account corresponding to the account ID.

In some embodiments of the application, the fare-collecting device may acquire the account ID after decrypting the encrypted data. Later, the fare-collecting may send the account ID obtained by decrypting the encrypted data to the server and the server may deduct the fare from the account corresponding to the account ID.

When a payment application is installed on the user terminal and the account ID is encrypted by the payment application, the server is the server corresponds to the payment application.

In addition, if the subway the user takes is in segment charging mode, the fare-collecting device may need to acquire over the NFC connection the encrypted data transmitted from the user terminal when the user enters and leaves a station (gets on and off when the user takes a bus). When the user enters a station, the fare-collecting device may make a record according to the account ID obtained by decrypting the encrypted data, and when the user leaves a station, the fare-collecting may calculate the fare according to the account ID obtained by decrypting the encrypted data and send the account ID and the fare to the server to cause the server to deduct the fare from the account corresponding to the account ID.

If the subway the user takes is in uniform charging mode (the fare is fixed regardless of the mileage), the fare-collecting device acquires the account ID and sends the account ID to the server when the user enters a station, and the server deducts the RMB2 fare from the account corresponding to the account ID.

In the prior method for paying a fare, a user terminal having the three hardware units of an NFC front-end chip, an NFC antenna and a security chip is equivalent to a public transit card, in which an account balance is stored, the user enters or leaves a station by moving the user terminal close to the induction zone of a subway gate, and the fare-collecting device may update the account balance stored in the security chip of the user terminal to complete fare deduction.

In some embodiments of the application, no account balance may be stored in a user terminal, the fare-collecting device may not directly perform a fare deduction operation, and the fare-collecting device may request the server to deduct a fare from the account of a user. The account ID of the user may be obtained by registering an account on the server. Therefore, the fare-collecting device may need to send the account ID sent by the user terminal to the server to request the server to deduct the fare from the account of the user. In this way, the fare-collecting device may complete a fare collection.

In addition, user A may theoretically use the encrypted data obtained by encrypting the account ID of user B to enter a station. That is, when user B enters a station, user A may intercept the encrypted data transmitted from the user terminal of user B to the fare-collecting device, and later use the encrypted data to enter the station, and the server may also deduct a fare from the account of user A.

To prevent this case, the user terminal may acquire the corresponding timestamp of the current time and encrypts the account ID of the user and the timestamp to obtain encrypted data in step S202. In step S208, the fare-collecting device may decrypt the encrypted data to obtain the account ID and the timestamp, and in step S210, the fare-collecting device may determine whether the time interval from the timestamp obtained by decrypting the encrypted data to the current time satisfies a specified condition. If yes, the fare-collecting device may send the account ID to the server, and if no, the fare-collecting device may refuse to send the account ID to the server. The specified condition may be a specified time length, and may be specified according to the requirement, for example, to be 5 seconds.

In this way, even if user B intercepts the encrypted data and later uses the encrypted data to enter a station, the fare-collecting device may determine that the encrypted data is invalid because of timeout and the fare-collecting device may refuse to send the account ID to the server.

In addition, when the encrypted data is obtained by the user terminal of user A by encrypting the account ID and the corresponding timestamp of the current time, user B may be prevented from later going into the station after intercepting the encrypted data. However, user B may use the intercepted encrypted data to enter the station from another subway gate at the moment when user A enters the station.

Therefore, in step S202, the user terminal may further acquire the device ID of the fare-collecting device and encrypt the account ID of the user, the corresponding timestamp of the current time and the device ID to obtain encrypted data. The user terminal may acquire the device ID over the established NFC connection. In step S208, the fare-collecting device may decrypt the encrypted data to obtain the account ID, timestamp and device ID. In step S210, the fare-collecting device not only needs to determine whether the time interval from the time corresponding to the timestamp obtained by decrypting the encrypted data to the current time satisfies a specified condition, but also needs to determine whether the device ID obtained by decrypting the encrypted data is consistent with its own device ID. If the two determination results are both yes, the fare-collecting device may send the account ID to the server, and if either determination result is no, the fare-collecting device may refuse to send the account ID to the server.

In this way, even if user B intercepts the encrypted data of user A and enters the station from another subway gate (or get on another bus) at the moment when user A enters the station, another subway gate may also determine that the device ID obtained by decrypting the encrypted data is not its own device ID and thus may refuse to send the account ID to the server.

In some embodiments, the timestamp and the device ID adopted in the above-mentioned technical means may be used separately. That is, the user terminal may encrypt the account ID and the corresponding timestamp of the current time to obtain encrypted data, or encrypt the account ID and the device ID of the fare-collecting device to obtain encrypted data.

In addition, in some embodiments of the application, when the fare-collecting device is online, the fare-collecting device may open the entrance and/or report no error to allow a user to enter a station or get on a bus while sending the account ID to the server. The fare-collecting device may report an error and/or close the entrance to prevent the user from entering the station or getting on the bus and refuse to send the account ID to the server.

When the fare-collecting device is offline, if the fare-collecting device refuses to send the account ID to the server, the fare-collecting device may report an error and/or close the entrance to prevent the user from going into the station or getting on the bus. If the fare-collecting device needs to send the account ID to the server, the fare-collecting device may first store the account ID to be sent and open the entrance and/or report no error to allow the user to go into the station or get on the bus. Then, the fare-collecting device may send the stored account ID to the server when it is connected to a network.

Through the method shown in FIG. 2, no security chip is required for a user terminal, and thus the corresponding hardware cost is saved. In addition, the account balance of a user is recorded and modified by the server, and the user may still take a public transit means by "swiping a mobile phone." Even if the user terminal of the user has no security chip, the user may move the user terminal close to a subway gate to enter a station and experience the "touch payment."

Figure 3:
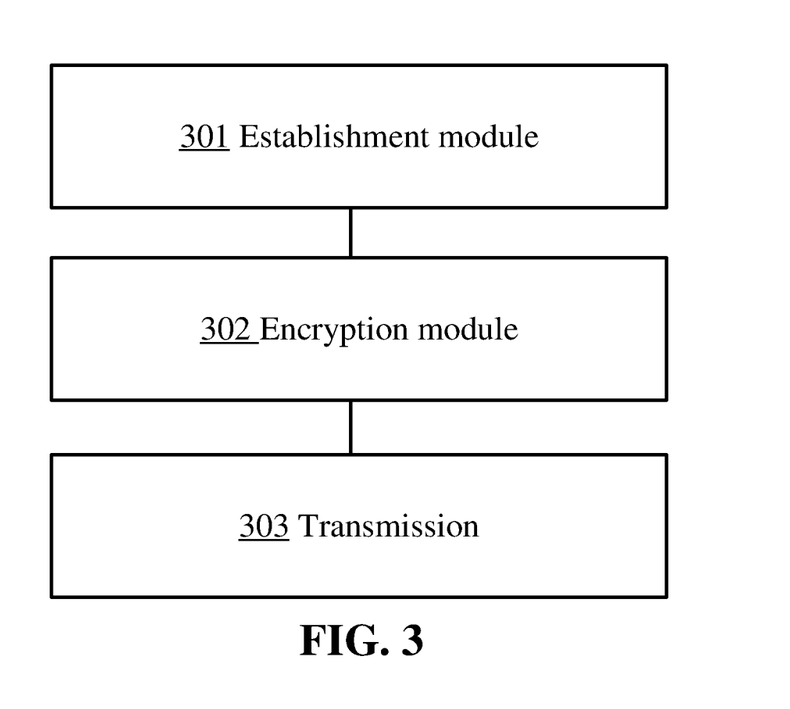
FIG. 3 is a schematic diagram for an apparatus for paying a fare in some embodiments of the application.

On the basis of the method for paying a fare in FIG. 2, some embodiments of the application further provide an apparatus for paying a fare accordingly. As shown in FIG. 3, the apparatus comprises: an establishment module 301, configured to establish an NFC connection with the fare-collecting device of a public transit means, an encryption module 302, configured to encrypt the account ID of a user according to the pre-agreed encryption algorithm of a public transit system to obtain encrypted data, and a transmission module 303, configured to transmit the encrypted data to the fare-collecting device over the NFC connection so that the fare-collecting device decrypts the encrypted data to obtain the account ID and sends the account ID to a server to cause the server to deduct a fare from the account corresponding to the account ID.

The encryption module 302 may acquire the corresponding timestamp of the current time and encrypt the account ID of a user and the timestamp to obtain encrypted data.

The encryption module 302 may acquire the device ID of the fare-collecting device over the NFC connection and encrypt the account ID of a user and the device ID to obtain encrypted data.

Figure 4:
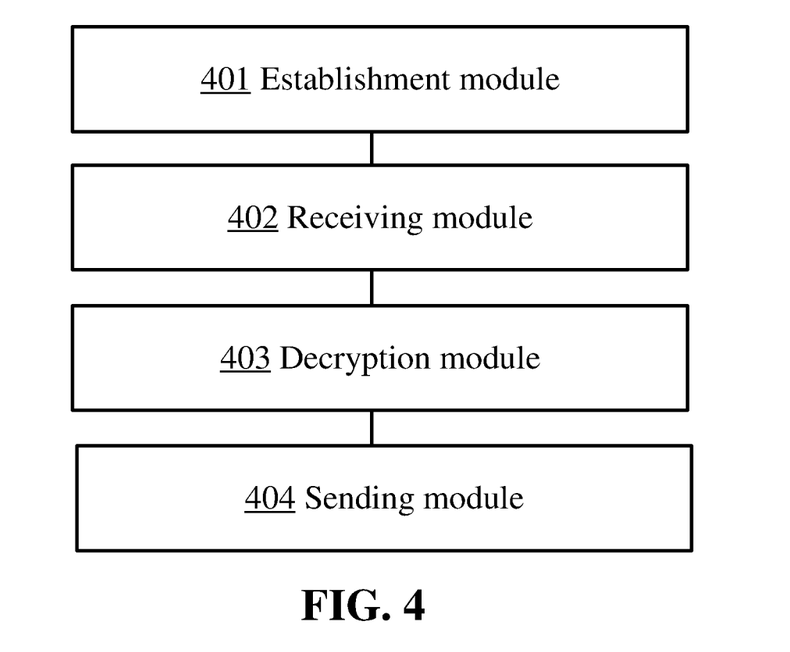
FIG. 4 is a schematic diagram for another apparatus for paying a fare in some embodiments of the application.

On the basis of the method for paying a fare in FIG. 2, some embodiments of the application further provide another apparatus for paying a fare accordingly. As shown in FIG. 4, the apparatus comprises: an establishment module 401, configured to establish an NFC connection with a user terminal, a receiving module 402, configured to receive over the NFC connection the encrypted data transmitted from the user terminal, a decryption module 403, configured to decrypt the encrypted data to obtain the account ID of the user, and a sending module 404, configured to send the account ID to a server so that the server deducts a fare from the account corresponding to the account ID.

The decryption module 403 may decrypt the encrypted data to obtain the account ID and the timestamp, and the sending module 404 may determine whether the time interval from the corresponding time of the timestamp to the current time satisfies a specified condition; if yes, the sending module may send the account ID to a server, and if no, the sending module may refuse to send the account ID to the server.

The decryption module 403 may decrypt the encrypted data to obtain the account ID and the device ID, and the sending module 404 may determine whether the device ID obtained from the decryption is consistent with its own device ID; if yes, the sending module may send the account ID to a server, and if no, the sending module may refuse to send the account ID to the server.

The sending module 404 may send the account ID to a server and open the entrance and/or reports no error, or refuse to send the account ID to the server and report an error and/or closes the entrance.

Figure 5:
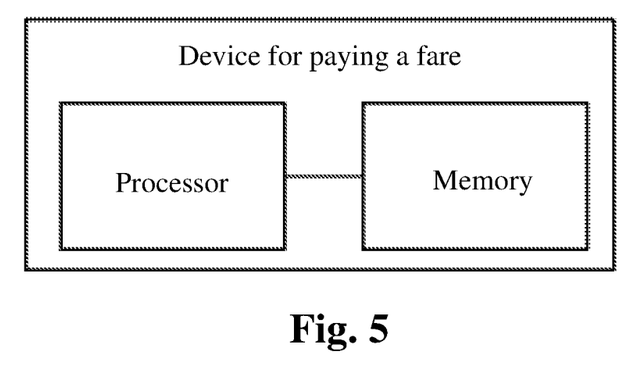
FIG. 5 is a schematic diagram for a device for paying a fare in some embodiments of the application.

On the basis of the method for paying a fare in FIG. 2, some embodiments of the application further provide a device for paying a fare accordingly. As shown in FIG. 5, the device comprises one or more processors and a memory, a program is stored in the memory and the device is so configured that the one or more processors perform the following steps: establishing an NFC connection with the fare-collecting device of a public transit means, encrypting the account ID of the user according to the pre-agreed encryption algorithm of a public transit system to obtain encrypted data, and transmitting the encrypted data to the fare-collecting device over the NFC connection so that the fare-collecting device decrypts the encrypted data to obtain the account ID and sends the account ID to a server to cause the server to deduct a fare from the account corresponding to the account ID.

Figure 6:
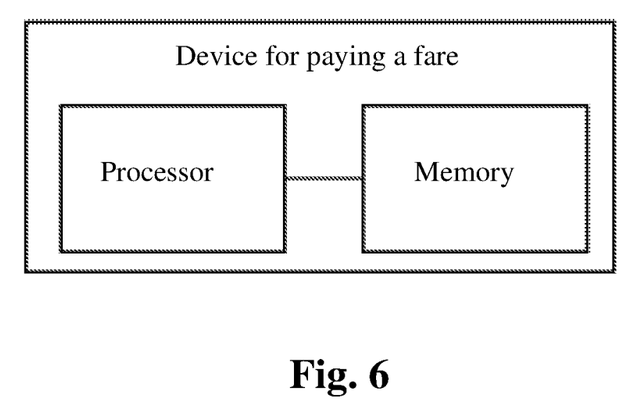
FIG. 6 is a schematic diagram for another device for paying a fare in some embodiments of the application.

On the basis of the method for paying a fare in FIG. 2, some embodiments of the application further provide another device for paying a fare accordingly. As shown in FIG. 6, the device comprises one or more processors and a memory, a program is stored in the memory and the device is so configured that the one or more processors perform the following steps: establishing an NFC connection with a user terminal, receiving over the NFC connection the encrypted data transmitted from the user terminal, decrypting the encrypted data to obtain the account ID of the user, and sending the account ID to a server so that the server deducts a fare from the account corresponding to the account ID.

Some embodiments in the description are described in a progressive way. For the same or similar parts between some embodiments, refer to these embodiments. Each embodiment focuses the differences from the others. Especially, for the devices in FIGS. 5 and 6, since they are similar to the embodiment of the method, their descriptions are brief. The relevant embodiments of the devices may be referred to the descriptions of the embodiments of the method.

In the 1990s, it may be obvious whether a technical improvement is a hardware improvement (for example, improvement of the circuit structure of a diode, a transistor or a switch) or software improvement (for example, improvement of the method process). However, with the development of technologies, the improvements of today's method processes have already been considered as direct improvements of hardware circuit structures. Designers may almost obtain a hardware circuit structure by programming an improved method process into a hardware circuit. Therefore, the improvement of a method process may be realized by hardware entity modules. For example, a programmable logic device (PLD), such as a field programmable gate array (FPGA) is such an integrated circuit whose logic function is determined by programming the device. Designers may themselves program a digital system to "integrate" it into a PLD, without asking a chip manufacturer to design and manufacture an application specific integrated circuit (ASIC) chip. Nowadays, programming which replaces manual manufacturing of integrated circuit chips is mostly done by a logic compiler, which is similar to a software compiler used for program development and writing. Original codes before compilation also need to be written by use of a specific programming language, for example, hardware description language (HDL). However, HDL is not the only programming language, and many other programming languages, for example, Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL) may be used. Currently, Very-High-Speed Integrated Circuit Hardware Description Language (VHDL) and Verilog are the most commonly used. A hardware circuit realizing a logic method process may easily be obtained by using some of the above-mentioned hardware description languages to perform logic programming for the method process and program it into an integrated circuit.

A controller may be realized in a proper way. For example, a controller may be a microprocessor or processor, a computer-readable medium in which computer-readable program codes (for example, software or firmware) executed by the (micro)processor are stored, a logic gate, a switch, an application specific integrated circuit (ASIC), a programmable logic controller and an embedded micro controller. Examples of a controller include but are not limited to the following microcontrollers: ARC 625D, Atmel AT91SAM, Microchip PIC18F26K20 and Silicone Labs C8051F320, and a memory controller may be realized as a part of the control logic of the memory. Those skilled in the art also know that besides a controller may be realized in the way of computer-readable program codes, the same function may completely be realized in the form of a logic gate, switch, ASIC, programmable logic controller, embedded microcontroller through logic programming of the procedure of a method. Therefore, such a controller may be considered as a hardware component and the devices configured to realize different functions in the hardware component may also be considered as structures in the hardware component. Or, the devices configured to realize different functions may even be considered as not only software modules realizing a method, but also structures in the hardware component.

The system, apparatus, modules or units described in some embodiments above may be realized by a computer chip or entity, or realized by a product having a function. A typical device is a computer. Specifically, the computer may be a personal computer, a laptop computer, a cellular phone, a camera phone, a smart phone, a personal digital assistant, a media player, a navigation device, an e-mail device, a game console, a tablet computer, a wearable device or any combination of these devices.

For the convenience of description, when the apparatus is described, the apparatus is functionally divided into different units and these units are described respectively. In some embodiments, the functions of different units may be realized in one or more pieces of software and/or hardware.

Some embodiments of the application may provide a method, a system or a computer program product. Therefore, hardware-only embodiments, software-only embodiments or embodiments combining software with hardware may be adopted for the application. In addition, the embodiment of a computer program product which may be implemented on one or more computer accessible storage media (including but not limited to disk memory, CD-ROM and optical memory) containing computer program codes may be adopted for the application.

The application is described by reference to the flowchart and/or block diagram of the method, device (system) and computer program product of some embodiments of the application. Each process in the flowchart and/or block in the block diagram and the combination of the processes in the flowchart and/or the blocks in the block diagram may be realized by computer program commands. These computer program commands may be provided in a general-purpose computer, a dedicated computer, an embedded processor or the processor of other programmable data processing equipment to produce a machine so that the commands executed by a computer or the processor of other programmable data processing equipment may produce a device configured to realize the designated functions in one process or more processes in the flowchart and/or in one block or more blocks in the block diagram.

These computer program commands may also be stored in a computer-readable memory which may boot a computer or other programmable data processing equipment to work in a specific mode so that the commands stored in the computer-readable memory may produce manufactures including a command device. The command device realizes the designated functions in one process or more processes in the flowchart and/or in one block or more blocks in the block diagram.

These computer program commands may also be uploaded to a computer or other programmable data processing equipment so that a series of operation steps are performed on the computer or other programmable data processing equipment to produce the processing realized by the computer and the commands executed on the computer or other programmable data processing equipment provide the steps for realizing the designated functions in one process or more processes in the flowchart and/or in one block or more blocks in the block diagram.

In a typical configuration, a computer device comprises one or more processors (CPU), an input/output interface, a network interface and a memory.

The memory may include a volatile memory, a random-access memory (RAM) and/or a nonvolatile memory of computer-readable media, for example, a read-only memory or a flash RAM. The memory is an example of computer-readable media.

Computer-readable media include volatile and nonvolatile media and mobile and immobile media, and they may realize information storage by use of any method or technique. Information may be computer-readable commands, data structures, modules of a program or other data. Examples of storage media of a computer include but are not limited to phase-change RAM (PRAM), static random access memory (SRAM), dynamic random access memory (DRAM), other types of random access memory (RAM), read-only memory (ROM), electrically erasable programmable read-only memory (EEPROM), flash memory or other memory techniques, compact disk read-only memory (CD-ROM), digital versatile disk (DVD), cassette tape, magnetic tape, magnetic disk or other storage device or any other non-transmission medium, and they may be configured to store information which may be accessed by a computer device. According to the definition in this document, computer-readable media excludes transitory media, for example, modulated data signals and carriers.

The terms "comprise" and "contain" and their variants are intended to cover non-exclusive inclusions so that the process, method, commodity or device comprising a series of elements not only comprises these elements, but also comprises other elements not listed clearly, or comprises the elements intrinsic to the process, method, commodity or device. Without any more restrictions, the element defined by "comprising one . . . " do not exclude the case that other identical elements exist in the process, method, commodity or device which comprises the element.

Some embodiments of the application may provide a method, a system or a computer program product. Therefore, hardware-only embodiments, software-only embodiments or embodiments combining software with hardware may be adopted for the application. In addition, the embodiment of a computer program product which may be implemented on one or more computer accessible storage media (including but not limited to disk memory, CD-ROM and optical memory) containing computer program codes may be adopted for the application.

The application may be described in the general context of a computer executable command executed by a computer, for example, a program module. Generally, a program module comprises a routine, program, object, component and data structure which execute a specific task or realize a specific abstract data type. The application may also be practiced in distributed computing environments. In the distributed computing environments, tasks are executed by remote processing equipment connected over a communication network. In distributed computing environments, a program module may be located in a local or remote computer storage medium including a storage device.

The above are only embodiments of the application, but are not used to restrict the application. Those skilled in the art may make various changes and modifications to the application. Any modification, equivalent replacement, and improvement within the spirit and principle of the application should fall within the scope of the claims of the application.

The invention claimed is:

1. A computer-implemented method, comprising:
establishing, by a user terminal device, a first near field communication (NFC) connection with a first fare-collecting device of a transit system;
obtaining, by the user terminal device, a device ID of the first fare-collecting device through the first NFC connection;
encrypting at a first timestamp, by the user terminal device, the device ID of the first fare-collecting device, the first timestamp, and an account ID of a user account associated with the user terminal device to obtain first encrypted data;
sending, by the user terminal device, the first encrypted data to the first fare-collecting device through the first NFC connection;

establishing, by the user terminal device, a second NFC connection with a second fare-collecting device of the transit system;
obtaining, by the user terminal device, a device ID of the second fare-collecting device through the second NFC connection;
encrypting at a second timestamp, by the user terminal device, the device ID of the second fare-collecting device, the second timestamp, and an account ID of a user account associated with the user terminal device to obtain second encrypted data; and
sending, by the user terminal device, the second encrypted data to the second fare-collecting device through the second NFC connection for deducting a fare from the user account based on the first encrypted data and the second encrypted data.

2. The method of claim 1, wherein the first fare-collecting device is configured to verify a time interval between the first timestamp and a current time is smaller than a time-length threshold.

3. The method of claim 1, wherein the encrypting the device ID of the first fare-collecting device and an account ID of a user account associated with the user terminal device to obtain the first encrypted data comprises:
encrypting, through a payment application installed on the user terminal device, the device ID of the first fare-collecting device and the account ID according to an encryption algorithm agreed by the payment application and the transit system.

4. The method of claim 1, wherein the user terminal device comprises:
an NFC front-end chip;
an NFC antenna; and
a security chip storing account balance of the user account.

5. The method of claim 4, further comprising:
receiving, from the second fare-collecting device, an updated account balance after the deduction and storing the updated account balance in the security chip.

6. The method of claim 1, wherein the first fare-collecting device is configured to verify the device ID of the first fare-collecting device in the first encrypted data is consistent with the device ID of first the fare-collecting device.

7. The method of claim 1, wherein the fare is deducted from the user account by:
sending the account ID to a server to deduct the fare.

8. A system for paying a fare, comprising a processor and a non-transitory computer-readable storage medium storing instructions executable by the processor to cause the system to perform operations comprising:
establishing a first near field communication (NFC) connection with a first fare-collecting device of a transit system;
obtaining a device ID of the first fare-collecting device through the first NFC connection;
encrypting, at a first timestamp, the device ID of the first fare-collecting device, the first timestamp, and an account ID of a user account to obtain first encrypted data; and
sending the first encrypted data to the first fare-collecting device through the first NFC connection;
establishing a second NFC connection with a second fare-collecting device of the transit system;
obtaining a device ID of the second fare-collecting device through the second NFC connection;
encrypting, at a second timestamp, the device ID of the second fare-collecting device, the second timestamp, and an account ID of a user account associated with a user terminal device to obtain second encrypted data; and
sending the second encrypted data to the second fare-collecting device through the second NFC connection for deducting a fare from the user account based on the first encrypted data and the second encrypted data.

9. The system of claim 8, wherein the first fare-collecting device is configured to verify a time interval between the first timestamp and a current time is smaller than a time-length threshold.

10. The system of claim 8, wherein the encrypting the device ID of the first fare-collecting device and an account ID of a user account associated with the user terminal device to obtain the first encrypted data comprises:
encrypting, through a payment application installed on the user terminal device, the device ID of the first fare-collecting device and the account ID according to an encryption algorithm agreed by the payment application and the transit system.

11. The system of claim 8, further comprising:
an NFC front-end chip;
an NFC antenna; and
a security chip storing account balance of the user account.

12. The system of claim 11, wherein the operations further comprise:
receiving, from the second fare-collecting device, an updated account balance after the deduction and storing the updated account balance in the security chip.

13. The system of claim 8, wherein the first fare-collecting device is configured to verify the device ID of the first fare-collecting device in the first encrypted data is consistent with the device ID of first the fare-collecting device.

14. A non-transitory computer-readable storage medium for paying a fare, configured with instructions executable by one or more processors to cause the one or more processors to perform operations comprising:
establishing a first near field communication (NFC) connection with a first fare-collecting device of a transit system;
obtaining a device ID of the first fare-collecting device through the first NFC connection;
encrypting, at a first timestamp, the device ID of the first fare-collecting device, the first timestamp, and an account ID of a user account to obtain first encrypted data; and
sending the first encrypted data to the first fare-collecting device through the first NFC connection;
establishing a second NFC connection with a second fare-collecting device of the transit system;
obtaining a device ID of the second fare-collecting device through the second NFC connection;
encrypting, at a second timestamp, the device ID of the second fare-collecting device, the second timestamp, and an account ID of a user account associated with a user terminal device to obtain second encrypted data; and
sending the second encrypted data to the second fare-collecting device through the second NFC connection for deducting a fare from the user account based on the first encrypted data and the second encrypted data.

15. The non-transitory computer-readable storage medium of claim 14, wherein the first fare-collecting device is configured to verify a time interval between the first timestamp and a current time is smaller than a time-length threshold.

16. The non-transitory computer-readable storage medium of claim 14, wherein the encrypting the device ID of the first fare-collecting device and an account ID of a user account associated with the user terminal device to obtain the first encrypted data comprises:
   encrypting, through a payment application installed on the user terminal device, the device ID of the first fare-collecting device and the account ID according to an encryption algorithm agreed by the payment application and the transit system.

17. The non-transitory computer-readable storage medium of claim 14, further comprising a security chip storing account balance of the user account, and
   wherein the operations further comprise:
   receiving, from the second fare-collecting device, an updated account balance after the deduction and storing the updated account balance in the security chip.

\* \* \* \* \*